(12) United States Patent
Nakawaki

(10) Patent No.: US 8,339,645 B2
(45) Date of Patent: Dec. 25, 2012

(54) MANAGING APPARATUS, IMAGE PROCESSING APPARATUS, AND PROCESSING METHOD FOR THE SAME, WHEREIN A FIRST USER STORES A TEMPORARY OBJECT HAVING ATTRIBUTE INFORMATION SPECIFIED BUT NOT PARTIAL-AREA DATA, AT A LATER TIME AN OBJECT IS RECEIVED FROM A SECOND USER THAT INCLUDES BOTH PARTIAL-AREA DATA AND ATTRIBUTE INFORMATION, THE STORAGE UNIT IS SEARCHED FOR THE TEMPORARY OBJECT THAT MATCHES ATTRIBUTE INFORMATION OF THE RECEIVED OBJECT, AND THE FIRST USER IS NOTIFIED IN RESPONSE TO A MATCH

(75) Inventor: Jun Nakawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 793 days.

(21) Appl. No.: 12/469,921

(22) Filed: May 21, 2009

(65) Prior Publication Data
US 2009/0296146 A1   Dec. 3, 2009

(30) Foreign Application Priority Data

May 27, 2008   (JP) .................................. 2008-138046

(51) Int. Cl.
*G06F 3/00* (2006.01)
*G06F 3/12* (2006.01)
*G06K 15/00* (2006.01)

(52) U.S. Cl. ......... 358/1.15; 358/1.9; 358/1.18; 715/751

(58) Field of Classification Search .................. 358/1.9, 358/1.15, 1.18; 715/751
See application file for complete search history.

(56) References Cited

U.S. PATENT DOCUMENTS

| 6,247,009 B1 * | 6/2001 | Shiiyama et al. ...................... 1/1 |
| 2007/0297672 A1 * | 12/2007 | Eschbach et al. ............. 382/173 |
| 2009/0259731 A1 * | 10/2009 | Luk et al. ...................... 709/219 |

FOREIGN PATENT DOCUMENTS

| JP | 04-123272 A | 4/1992 |
| JP | 11-212962 A | 8/1999 |
| JP | 2004-005122 A | 1/2004 |

* cited by examiner

*Primary Examiner* — Twyler Haskins
*Assistant Examiner* — Fred Guillermety
(74) *Attorney, Agent, or Firm* — Canon USA, Inc., IP Division

(57) ABSTRACT

A temporary object is registered in a document managing system in advance on the basis information about an object that a user wants to use. Then, when an object is registered by another user, it is determined whether the registered object is a similar object corresponding to the temporary object. If the registered object is a similar object, the user is notified of that fact, and the temporary object in target document data is updated with the similar object.

13 Claims, 15 Drawing Sheets

| Object ID | Name | Attribute | Temporary object flag | Creator | Object data |
|---|---|---|---|---|---|
| * | New MFP | Scanner, Fax, and Design | NULL | B | Binary |

COMPARE ATTRIBUTES

INCREMENT SIMILARITY (b)

| Object ID | Name | Attribute | Temporary object flag | Creator | Object data | Similarity |
|---|---|---|---|---|---|---|
| 0 | MFP | Scanner and printer | FALSE | C | Binary | — |
| 1 | LBP | Printer | FALSE | C | Binary | — |
| 2 | FAX | Transmission and Reception | FALSE | B | Binary | — |
| 3 | New MFP | Scanner, FAX, Printer, and Module | TRUE | A | NULL | 3 |
| 4 | Phone | FAX Number, and Receiver | TRUE | C | NULL | 0 |

MANAGING APPARATUS, IMAGE
PROCESSING APPARATUS, AND
PROCESSING METHOD FOR THE SAME,
WHEREIN A FIRST USER STORES A
TEMPORARY OBJECT HAVING ATTRIBUTE
INFORMATION SPECIFIED BUT NOT
PARTIAL-AREA DATA, AT A LATER TIME AN
OBJECT IS RECEIVED FROM A SECOND
USER THAT INCLUDES BOTH
PARTIAL-AREA DATA AND ATTRIBUTE
INFORMATION, THE STORAGE UNIT IS
SEARCHED FOR THE TEMPORARY OBJECT
THAT MATCHES ATTRIBUTE
INFORMATION OF THE RECEIVED OBJECT,
AND THE FIRST USER IS NOTIFIED IN
RESPONSE TO A MATCH

BACKGROUND OF THE INVENTION

1. Field of the Invention

The present invention relates to a method for reusing an object extracted or generated from a document input to an image processing apparatus, such as a multifunction peripheral (MFP) or a scanner.

2. Description of the Related Art

Hitherto, reusing a document has been performed in a document managing system, for example, a user searches for a registered document and views or copies the document.

Also, there exists a technique for updating a created document (e.g., Patent Document 1: Japanese Patent Laid-Open No. 11-212962). According to the method suggested in Patent Document 1, a user creates a document by obtaining predetermined image data of JPEG or the like from a database (DB) and inserting the image data into the document. Then, when the image data used is manually updated in the DB, the user selects update or non-update of the image data in the document.

Easily-reusable data is not data of a document itself, but is often multi-purpose data of a partial area included in the document. For example, when a document includes sentences describing a printer and a photo of the printer, it is more convenient for the user that the photo of the printer is separated and extracted from the document and is registered as partial-area data in the DB, compared to the case where only data of the document is registered.

In creation of a document, the technique according to the above-mentioned Patent Document 1 is capable of pasting an existing image on the document and updating the image in the document when the image is updated.

In some cases, however, image data of a figure or the like desired by a document creator does not exist in a DB at the time of creating a document. Here, assume that partial-area data extracted from a document and attribute information specified are regarded as an object, which is managed in a DB under the assumption of being reused for creating a document.

The document creator draws an image by himself/herself or manually searches the DB until an object has been registered therein. Also, according to Patent Document 1, update of an object is manually performed by a user, so that a best object is not found automatically during creation of a document.

The DB to manage objects may have a mechanism of automatically registering an object obtained through scanning in an MFP or the like. In that case, however, the amount of data of objects managed in the DB increases and data management is complicated, and thus a searching efficiency decreases disadvantageously.

SUMMARY OF THE INVENTION

Accordingly, the present invention provides a method for easily using an object that is not registered in a DB at the time of creating a document and that is registered after information about the object is specified by a user.

Also, the present invention provides a method for allowing a user to appropriately select an object to be registered from among objects created on the basis of document data at the time of registering the object.

A managing apparatus according to an embodiment of the present invention includes a storage unit configured to store a temporary object that has attribute information specified and that does not include partial-area data on the basis of instructions from a user; an object receiving unit configured to receive an object that includes partial-area data extracted from document data and that has attribute information specified; a searching unit configured to search the storage unit for the temporary object having attribute information specified that matches at least one piece of attribute information of the object received by the object receiving unit; and a notifying unit configured to notify the user that the object corresponding to the temporary object stored in the storage unit has been received on the basis of a search result generated by the searching unit.

An image processing apparatus according to an embodiment of the present invention connects to a managing apparatus to manage an object that includes partial-area data extracted from document data and that has attribute information specified. The image processing apparatus includes an extracting unit configured to extract partial-area data from input document data; a transmitting unit configured to transmit information of an object based on the partial-area data extracted by the extracting unit to the managing apparatus; a receiving unit configured to receive, as a response to the information transmitted by the transmitting unit, a notification that the object based on the partial-area data extracted by the extracting unit is an object corresponding to a temporary object that has specified attribute information stored in the managing apparatus and that does not include partial-area data; a display unit configured to perform display to accept instructions to register the object based on the partial-area data extracted by the extracting unit from a user; and an object transmitting unit configured to transmit the object to be registered to the managing apparatus. The display unit displays the object corresponding to the temporary object stored in the managing apparatus so that the object can be identified, on the basis of the notification received by the receiving unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 illustrates an example of data tables used to search for an object according to the first embodiment.

DESCRIPTION OF THE EMBODIMENTS

Hereinafter, embodiments of the present invention are described with reference to the attached drawings.

First Embodiment

Figure 1:
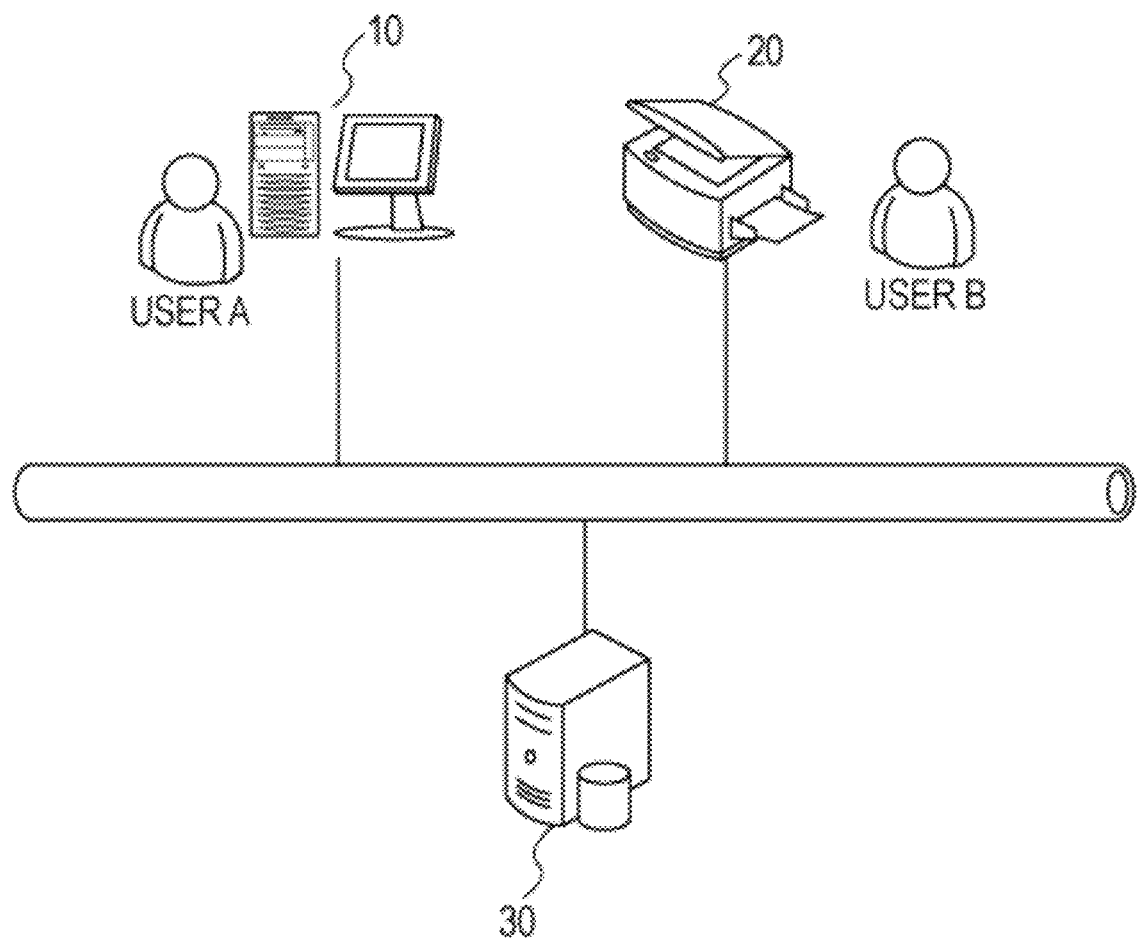
FIG. 1 is a conceptual view illustrating a system according to an embodiment of the present invention.

A first embodiment of the present invention is described with reference to FIGS. 1 to 14.
<System Configuration>
FIG. 1 is a conceptual view illustrating a document managing system according to an embodiment of the present invention. A client PC (personal computer) 10 is used by user A according to this embodiment to create and store a document and access a document managing server PC 30 (managing apparatus). An MFP (multifunction peripheral) 20 is used by user B according to this embodiment to scan a paper document and register an object in the document managing server PC 30. The document managing server PC 30 manages and searches for object information according to this embodiment. The client PC 10, the MFP 20, and the document managing server PC 30 are mutually connected via a network.

Here, the respective functions constituting the document managing system: the client PC 10, the MFP 20 to register an object, and the document managing server PC 30, are placed separately from each other. Alternatively, those functions may be provided in a PC.

Furthermore, in a document managing service according to this embodiment, user A accesses the document managing server PC 30 via a client application whereas user B accesses the document managing server PC 30 via an MFP application. Alternatively, the access may be achieved via a browser.

In a conventional MFP, a format unique to the MFP is used as an internal data format to execute functions loaded in the MFP (copy, print, fax, scan, etc.). The format is for processing image data and is optimum to temporarily hold image data. Thus, when taken out from the MFP, the format functions simply as an image format of a bit string and does not serve as an electronic document. Also, vector data has been expanded at a specific resolution, and thus processing or scaling up/down of the image data involves degradation, which is inappropriate. In order to solve this problem, a technique of managing image data as an object that holds vector data together with its attribute information has been developed.

Figure 2:
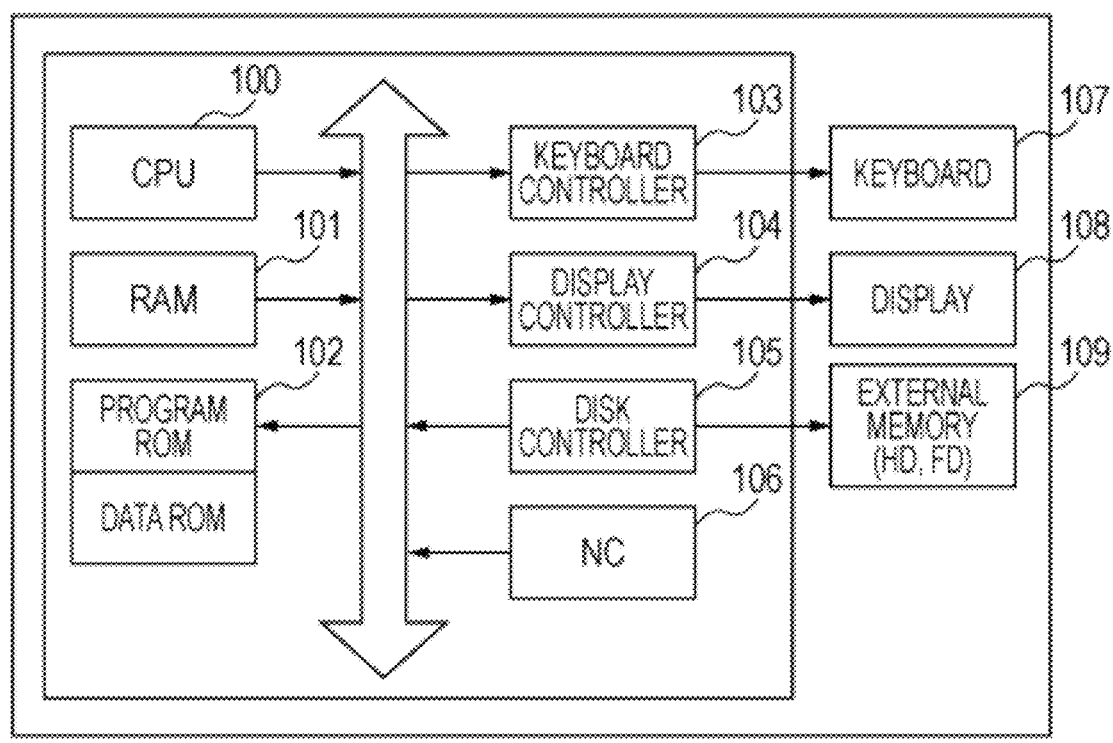
FIG. 2 illustrates a hardware configuration of a PC according to an embodiment of the present invention.

The client PC 10, the MFP 20, and the document managing server PC 30 in this system according to this embodiment deal with such objects.
<Hardware Configuration>
FIG. 2 illustrates a hardware configuration of each of the PCs constituting the document managing system according to this embodiment of the present invention. The hardware configuration illustrated in FIG. 2 corresponds to a hardware configuration of a typical information processing apparatus. That is, a hardware configuration of a typical information processing apparatus can be applied to each of the PCs 10 and 30 according to this embodiment.

Referring to FIG. 2, a CPU (Central Processing Unit) 100 executes a program, such as an OS or an application, stored in a program ROM (Read Only Memory) of a ROM 102 or loaded from a hard disk 109 to a RAM (Random Access Memory) 101. Here, the OS is an abbreviation for operating system that operates in a computer. Hereinafter, the operating system is called an OS. The processes of the respective flowcharts described below can be realized by executing this program. The RAM 101 functions as a main memory or a work area of the CPU 100. A keyboard controller 103 controls key inputs from a keyboard 107 or a pointing device (not illustrated). A display controller 104 controls display in a display 108. A disk controller 105 controls data access in the hard disk (HD) 109 or a floppy disk (FD) storing various data. A network controller (NC) 106 connects to a network and controls communication with another apparatus connected to the network.

Figure 3:
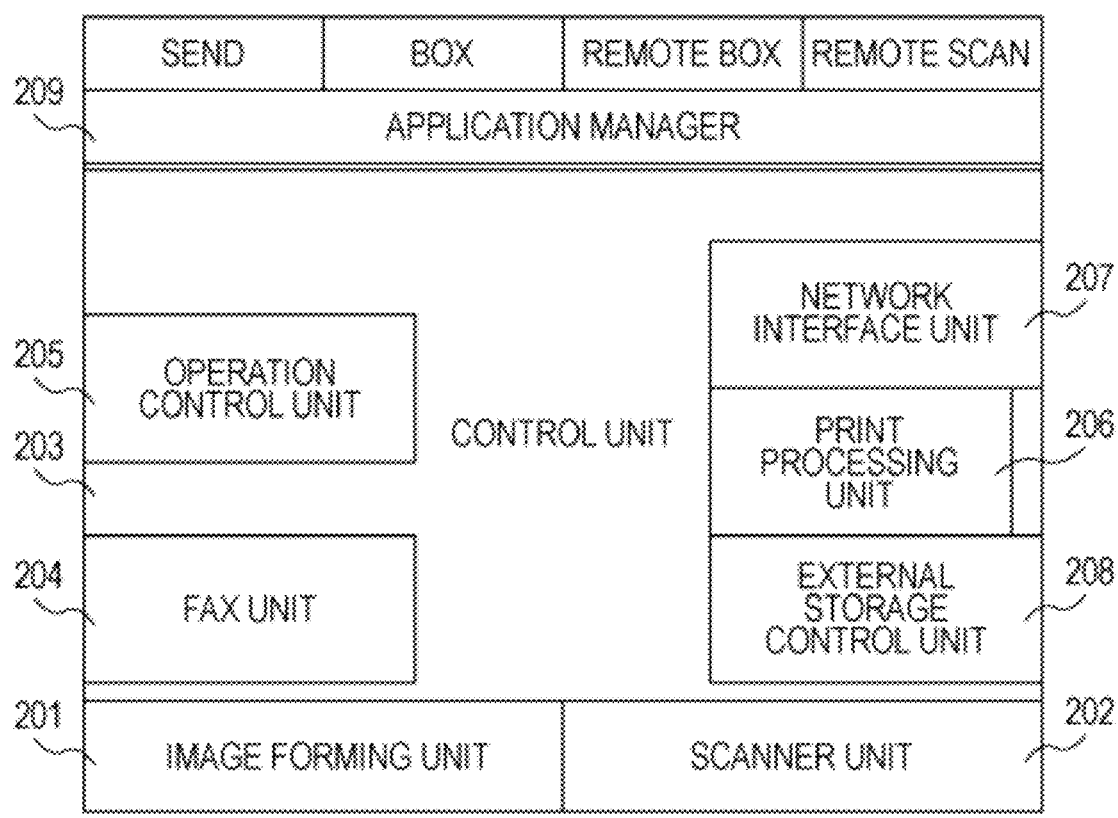
FIG. 3 illustrates a hardware configuration of an MFP according to an embodiment of the present invention.

FIG. 3 illustrates a configuration of the MFP 20 according to this embodiment of the present invention.

Referring to FIG. 3, an image forming unit 201 executes handling of paper and an image forming process including transfer and fixing of an image, so as to form an image on a recording medium, such as a recording sheet. The image forming unit 201 includes an image forming unit based on electrophotography. In this embodiment, the image forming unit 201 may include an inkjet printer. A scanner unit 202 performs a scanning process on a paper document. The scanner unit 202 is capable of optically reading a document image, converting the image to digital image information, and outputting the digital image information to the image forming unit 201 so as to form an image. Also, the scanner unit 202 is capable of supplying the digital image information to a fax unit 204 or a network interface unit 207 so as to transmit the information via a line.

A control unit 203 controls operations of the image forming unit 201 and the scanner unit 202, for example, performs control so that document information read by the scanner unit 202 is copied by the image forming unit 201. Also, the control unit 203 includes the network interface unit 207, a print processing unit 206, the fax unit 204, and an operation control unit 205, and controls transmission/reception of information among those units. The fax unit 204 is capable of transmitting/receiving facsimile images, that is, transmitting digital image information read by the scanner unit 202 by fax and decoding received facsimile signals and allowing the image forming unit 201 to record the signals. The operation control unit 205 performs control to generate signals according to an operation performed by a user using an operation panel of an operation unit and to display various data and messages on a display unit or the like. The print processing unit 206 performs control to process a print job input via the network interface unit 207, output the print job to the image forming unit 201, and perform printing. The network interface unit 207 controls transmission/reception of data to/from a communication terminal via a communication line.

An external storage control unit 208 is capable of converting an image read by the scanner unit 202 to a data format that can be stored in an external storage and storing the image in the external storage. Also, the external storage control unit 208 is capable of reading stored data, allowing the image forming unit 201 to perform printing, and transmitting the data to an external apparatus via the network interface unit 207.

An application manager 209 manages applications of copy, scan, and so on. The application manager 209 controls the respective applications by accepting start, end, install, and uninstall of the respective applications and by receiving information about the apparatus generated by the control unit 203.

<Software Configuration>

Figure 4:
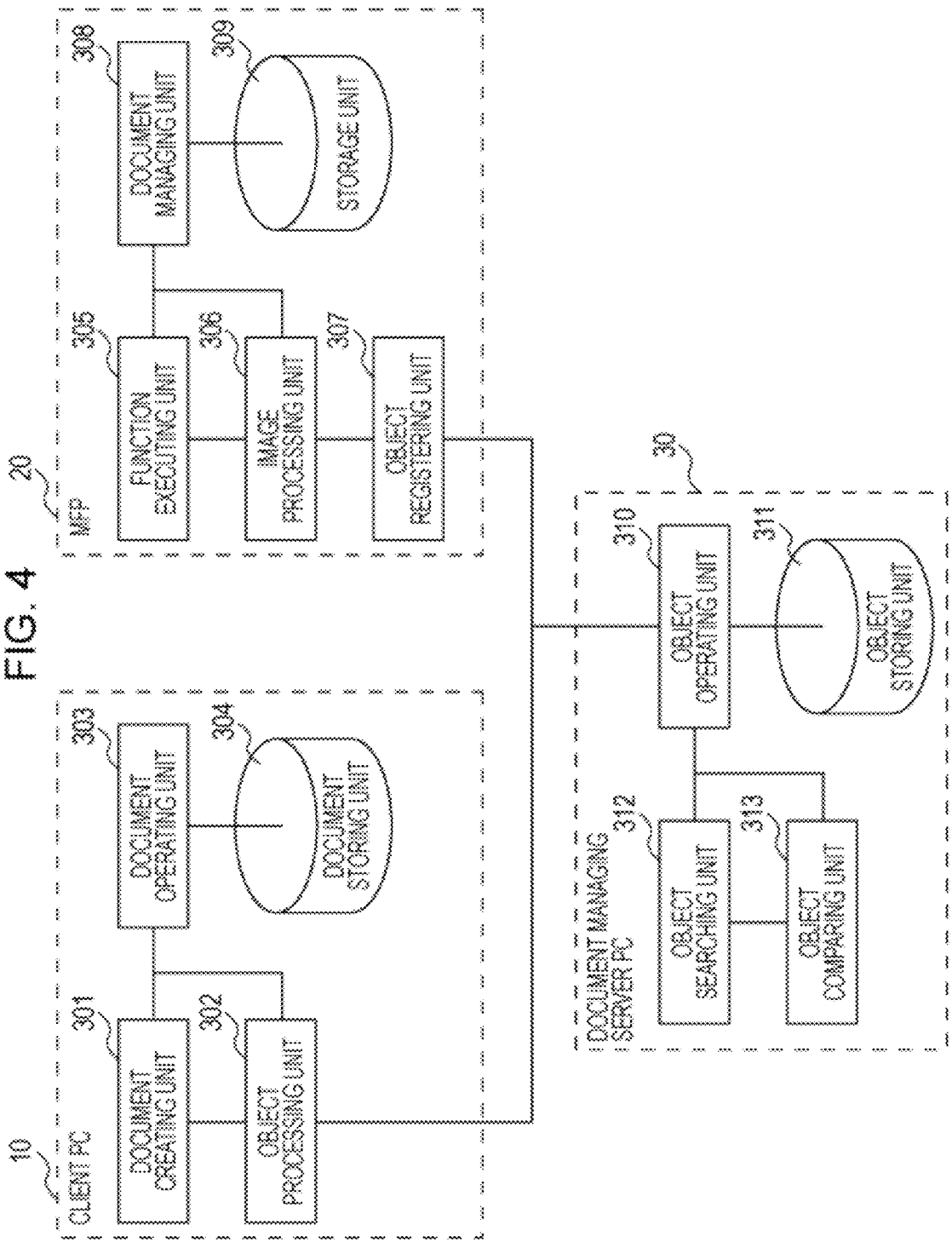
FIG. 4 illustrates a software configuration of the system according to an embodiment of the present invention.

FIG. 4 illustrates a software configuration of the document managing system according to this embodiment of the present invention. Specifically, FIG. 4 illustrates a software configuration of the client PC 10, the MFP 20, and the document managing server PC 30.

A document creating unit 301 creates document data in response to instructions from a user. An object processing unit 302 receives instructions from the document creating unit 301, communicates with the document managing server PC 30, and obtains a necessary object. Also, the object processing unit 302 supplies a selected object to the document creating unit 301 in response to instructions from the user and places the object in a document so that the document is created. A document operating unit 303 stores created document data in a document storing unit 304 and reads stored document data in response to instructions from the document creating unit 301.

A function executing unit 305 operates hardware devices in the MFP 20, such as a printer, scanner, and fax, and executes the functions. An image processing unit 306 analyzes image data executed in the function executing unit 305 and generated by the scanner unit 202 and divides the image data into partial areas. Then, the image processing unit 306 extracts objects having information of the partial areas and attribute information thereof. The information of the partial areas includes image data or text data. In the case of image data, vectorization is performed as necessary and the image data is held as vector data. The attribute information may include information based on a feature value of the image data or an OCR result of the text data, in addition to information indicating image data or text data. Also, the image processing unit 306 converts the resolution and size of image data. An object registering unit 307 registers an object generated in the image processing unit 306 by communicating with the document managing server PC 30. A document managing unit 308 stores or reads image data processed in the image processing unit 306 in or from a storage unit 309 in response to instructions from the function executing unit 305.

An object operating unit 310 accepts requests for registration, search, deletion, and so on of an object in accordance with instructions from the client PC 10 or the MFP 20, and stores or reads an object in or from an object storing unit 311. An object searching unit 312 searches for an object stored in the object storing unit 311 in response to instructions from the object operating unit 310. An object comparing unit 313 compares objects and calculates the similarity therebetween in accordance with a predetermined rule in response to instructions from the object searching unit 312.

<Process of Inserting Temporary Object>

Figure 5:
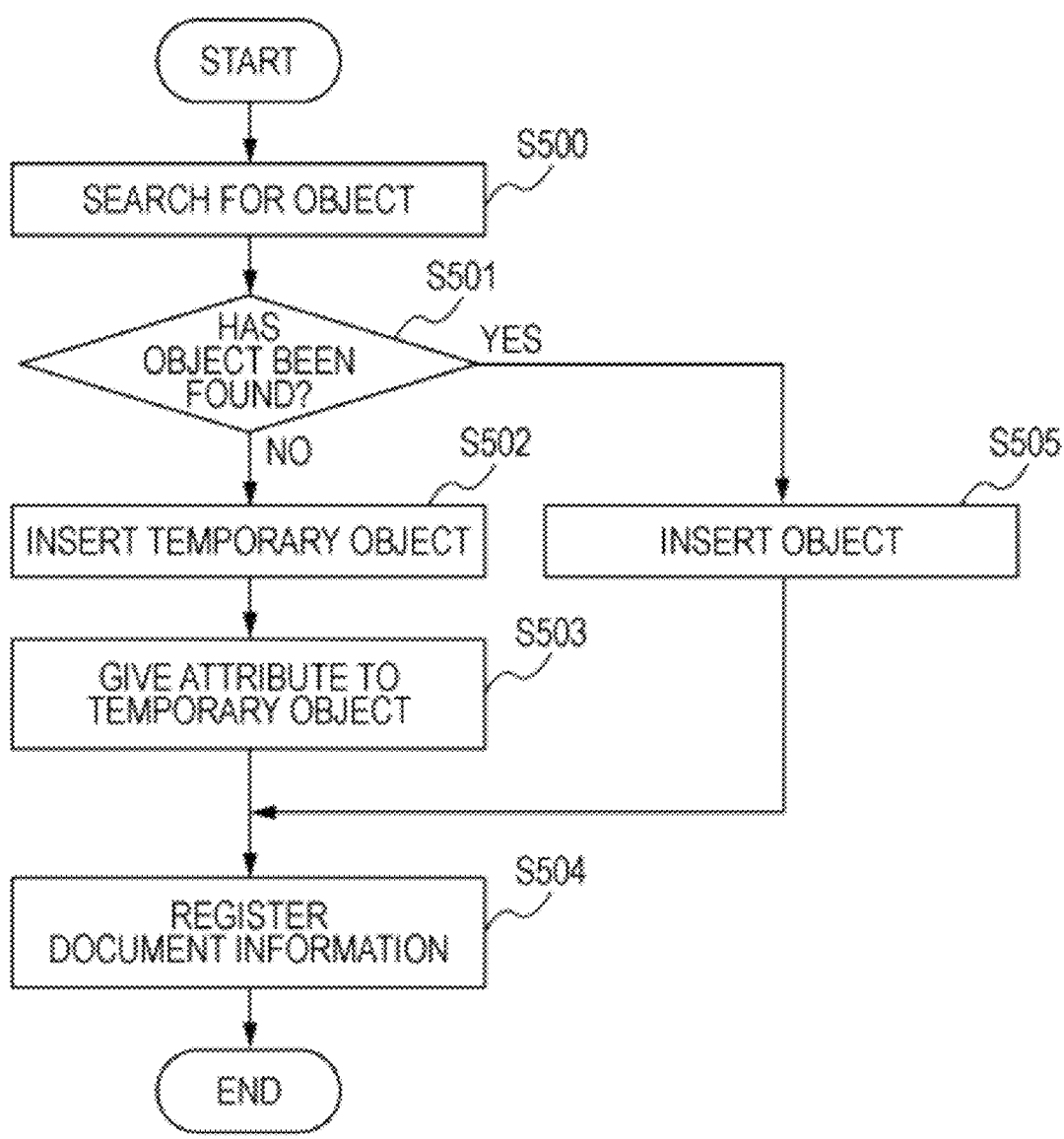
FIG. 5 is a flowchart illustrating a process of inserting a temporary object during creation of a document in a client PC according to a first embodiment of the present invention.
Figure 9:
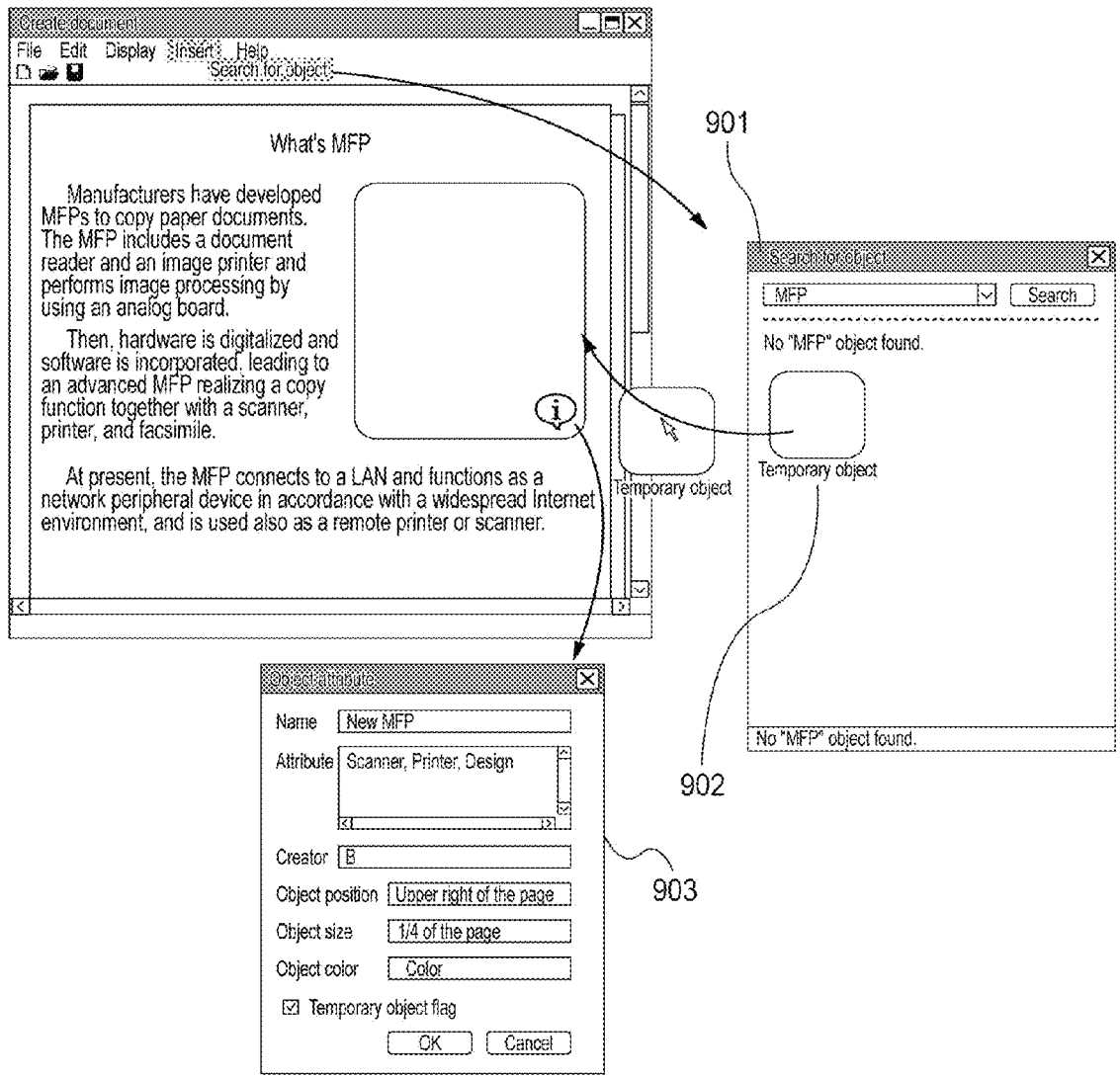
FIG. 9 illustrates a user interface related to insertion of a temporary object during creation of a document in the client PC according to the first embodiment.
Figure 10:
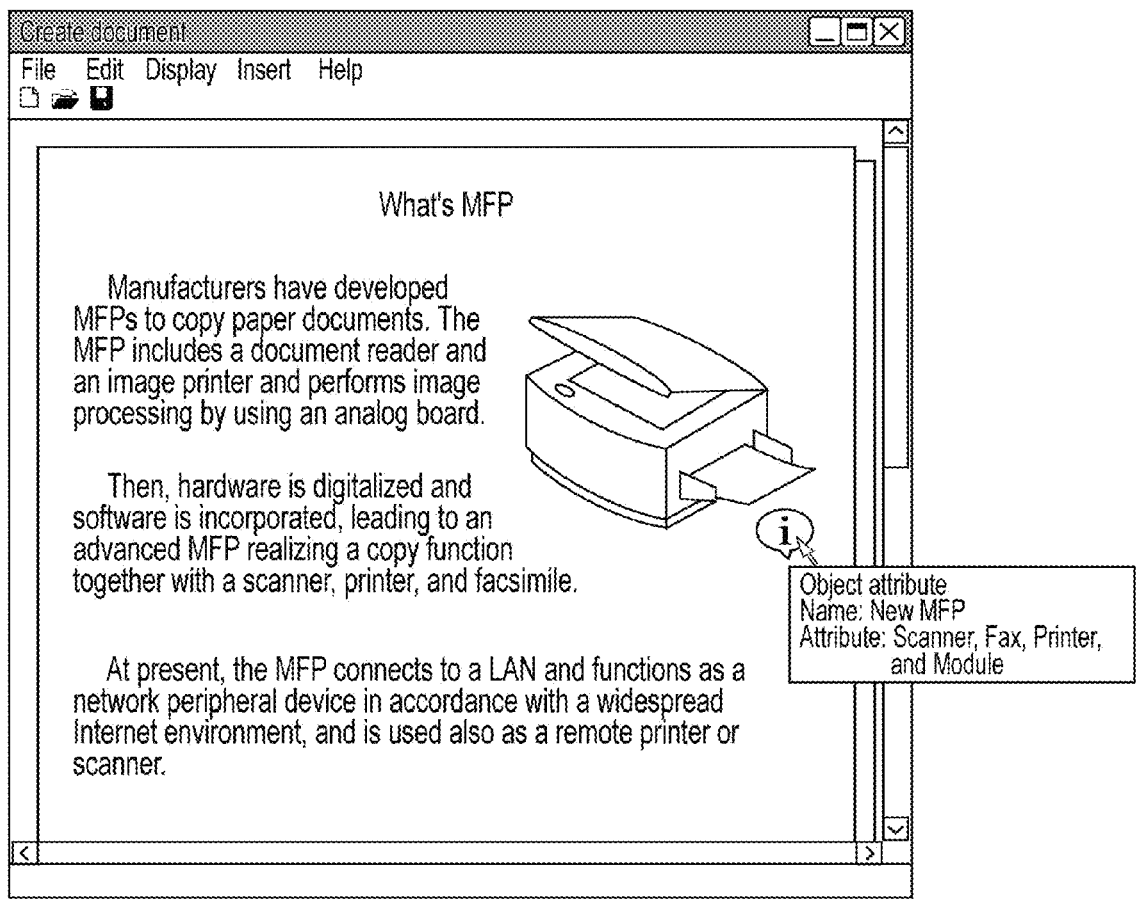
FIG. 10 illustrates a user interface in the state where an object has been inserted in the client PC according to the first embodiment.
Figure 11:
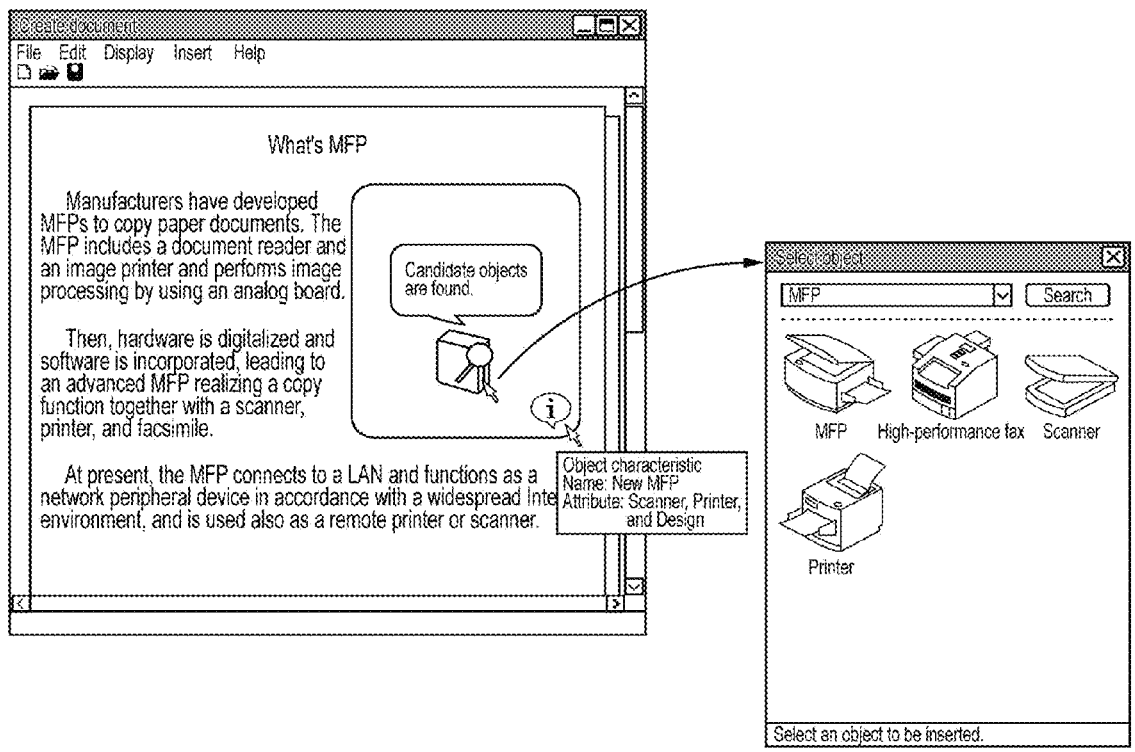
FIG. 11 illustrates a user interface allowing a user to select an object from among candidate objects in the client PC according to the first embodiment.

When user A wants to create a document in the client PC 10 by placing an object, such as an image, figure, graph, or text, in the document, user A accesses the document managing server PC 30 and searches for a desired object. FIG. 5 is a flowchart illustrating a process of searching for an object during creation of a document, the process being based on a program in the client PC 10. FIG. 9 illustrates an example of a user interface related to this process. Hereinafter, the process is described in detail with reference to those figures.

In step S500, user A accesses the document managing server PC 30 from the client PC 10. At this time, display of a screen and operation of a document may be performed in the client PC 10 on the basis of the function provided as a web application of the document managing server PC 30.

Then, user A inputs a keyword to search for an object or determines a position where an object is to be inserted in the document. At this time, a representative keyword may be extracted from a sentence near the position where the object is to be inserted, and the extracted keyword may be used for search. Here, a keyword for search is input or displayed as shown in a UI (User Interface) 901 in FIG. 9. Press on a search button by the user causes the keyword that has been input or automatically extracted to be transmitted to the document managing server PC 30.

In step S501, the client PC 10 receives a search result from the document managing server PC 30. If one or more objects are registered in the document managing server PC 30 and if the objects can be obtained, the process proceeds to step S505. At this time, if one or more objects that match the keyword are found and obtained, the objects are displayed in the UI 901. On the other hand, if an object that matches the keyword is not registered in the document managing server PC 30 and if an object is not obtained, the process proceeds to step S502.

In step S505, display is performed so that an object selected from among the objects that are found and obtained can be inserted. Specifically, the object is inserted into the document by drag-and-drop from the search result shown in FIG. 11.

In step S502 (when no object is obtained in step S501), display is performed to insert a temporary object (denoted by reference numeral 902 in FIG. 9). Then, user A inserts the temporary object to an arbitrary place in the document. For example, as illustrated in FIG. 9, the temporary object can be inserted by dragging the temporary object from an object searching UI and dropping it at an arbitrary place in the document. Furthermore, user A arbitrarily adjusts the size and position of the inserted temporary object, and also sets the appearance of the temporary object in the document.

Then, in step S503, display is performed to give an attribute to the temporary object. Specifically, a UI 903 illustrated in FIG. 9 is displayed. In order to give an attribute, a keyword that is automatically extracted from a sentence near the position where the temporary object is inserted may be displayed as default. Alternatively, a keyword may be manually input. The value input here is set as an attribute of the temporary object.

Then, user A stores the document that is being created and ends the document creating operation. At this time, in step S504, the document information and the temporary object that is included in the document information and that has attribute information are transmitted to the document managing server PC 30 and are registered therein.

<Request for Object Registration in MFP>

Figure 6:
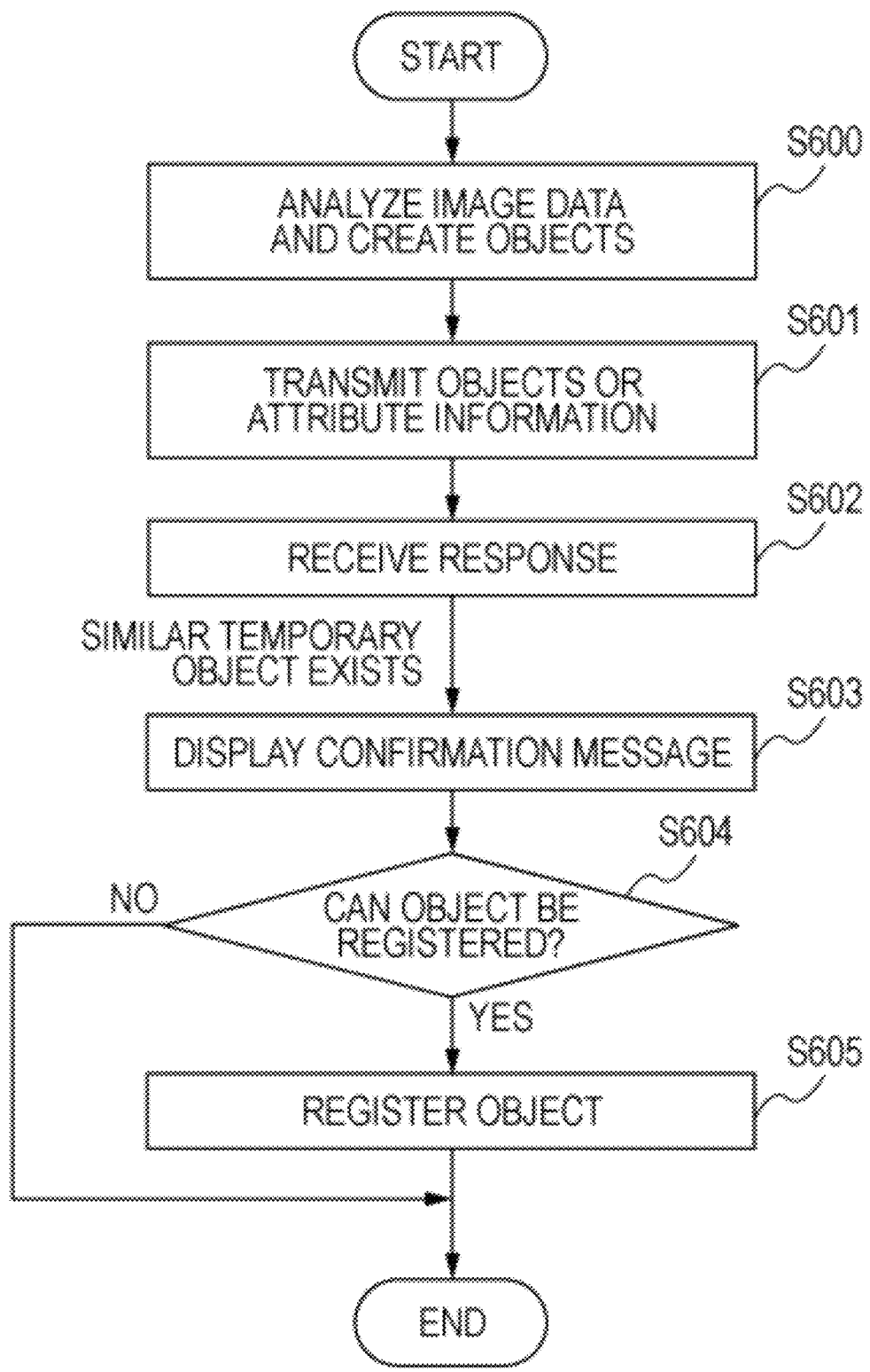
FIG. 6 is a flowchart illustrating a process of creating and registering an object in an MFP according to the first embodiment.
Figure 12:
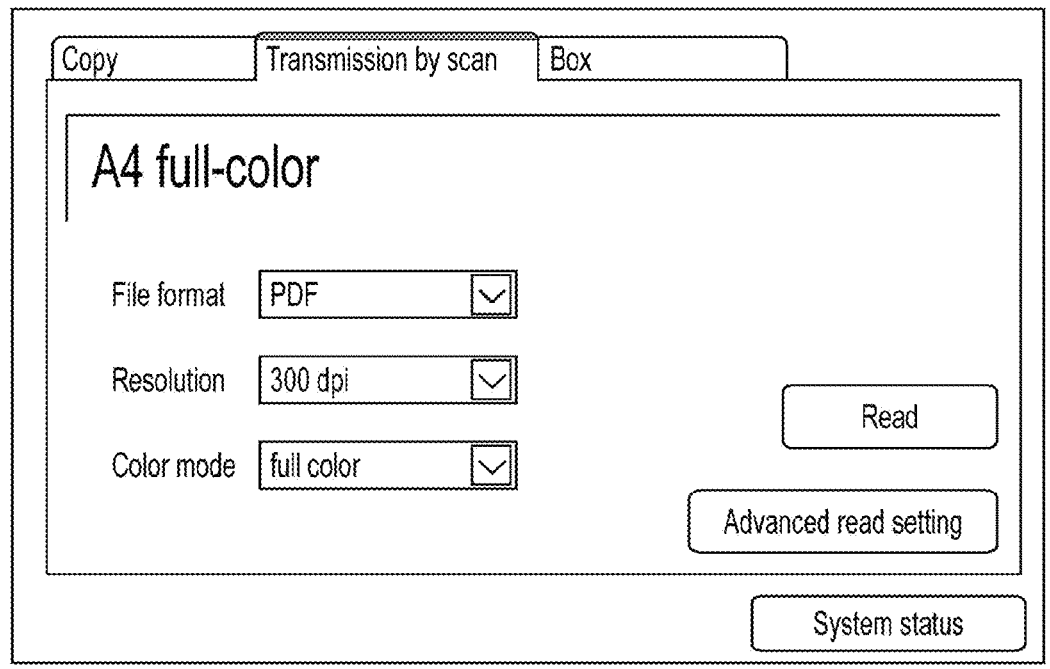
FIG. 12 illustrates a user interface to provide instructions to execute a scan job in the MFP according to the first embodiment.
Figure 13:
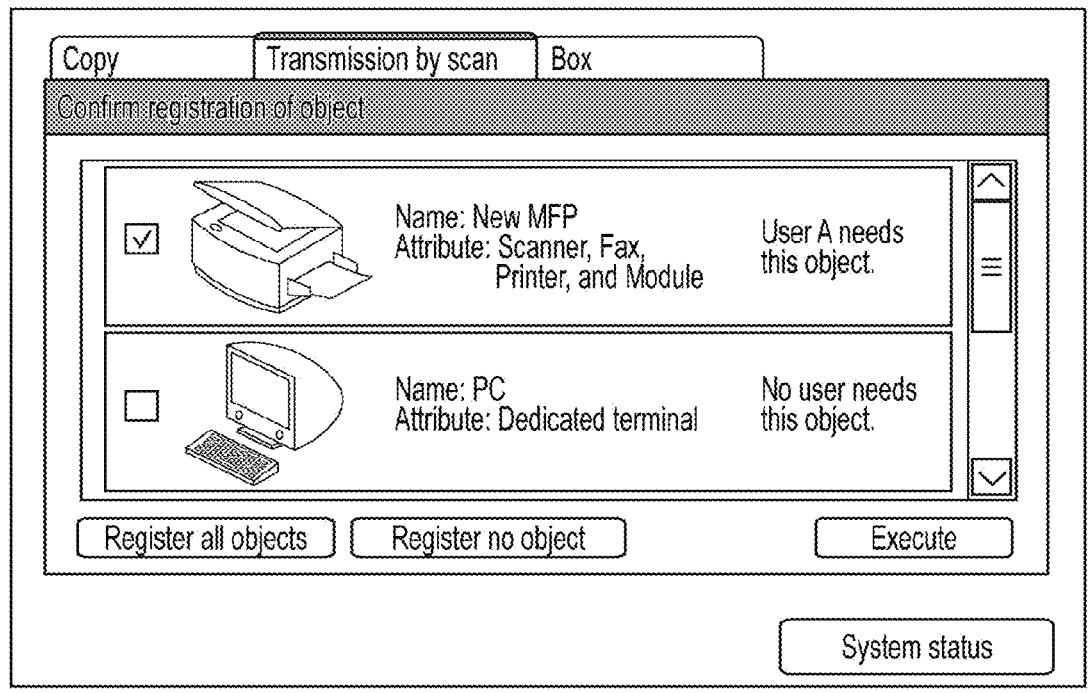
FIG. 13 illustrates a user interface to specify an object to be registered in the MFP according to the first embodiment.

A paper document is scanned in the MFP 20 in response to instructions from user B, or a printing process is performed in response to a request from the client PC 10. FIG. 6 is a flowchart illustrating a process of analyzing image data, extracting an object, and registering the object, performed in the MFP 20 at that time. FIGS. 12 and 13 illustrate examples of user interfaces used in this flowchart. Hereinafter, the process is described in detail with reference to those figures.

In step S600, image data processed in the MFP 20 is analyzed, and one or more objects are created on the basis of partial-area data included in the image data (partial areas of image or text). Here, each object is created by restoring a partial area of an image as vector data and associating attribute information about the image to the data. The image data to be processed can be input by scan, for example. Instructions to perform scanning are provided in accordance with the display on the display unit of the MFP 20, as illustrated in FIG. 12. Alternatively, a feature value of an image or login user information of a creator may be automatically set as attribute information. Furthermore, an object name and other attribute information may be input by the user. Accordingly, the efficiency of the searching process described below increases.

Then, in step S601, the objects created in step S600 are transmitted to the document managing server PC 30. Alternatively, only attribute information of the objects used for the searching process described below may be transmitted.

In step S602, a response to the transmission in step S601 is received from the document managing server PC 30, and the response is determined. A process of determining the response, performed in the document managing server PC 30, is described below.

In step S603, a UI (user interface) of a confirmation message illustrated in FIG. 13 is displayed. Here, a list of the objects created in step S600 is displayed. Furthermore, if there is an object whose temporary object corresponding to the attribute information transmitted in step S601 is registered in the document managing server PC 30 in the response received in step S602, the object is displayed so that the user can recognize that another user needs the object. Accordingly, user B can determine whether the object created on the basis of the document information input by the user can be used by another user. Specifically, the user can select an object to be registered in the document managing server PC 30 by checking the box attached to the displayed object.

The object that is determined to be registered by user B, that is, the object specified by user B via the UI illustrated in FIG. 13 (YES in step S604), is transmitted by the object registering unit 307 so that the object is registered in the document managing server PC 30 in step S605. On the other hand, the object that is determined not to be registered by user B (NO in step S604) is not transmitted to the document managing server PC 30.

<Object Registering Process in Document Managing Server PC>

Figure 7:
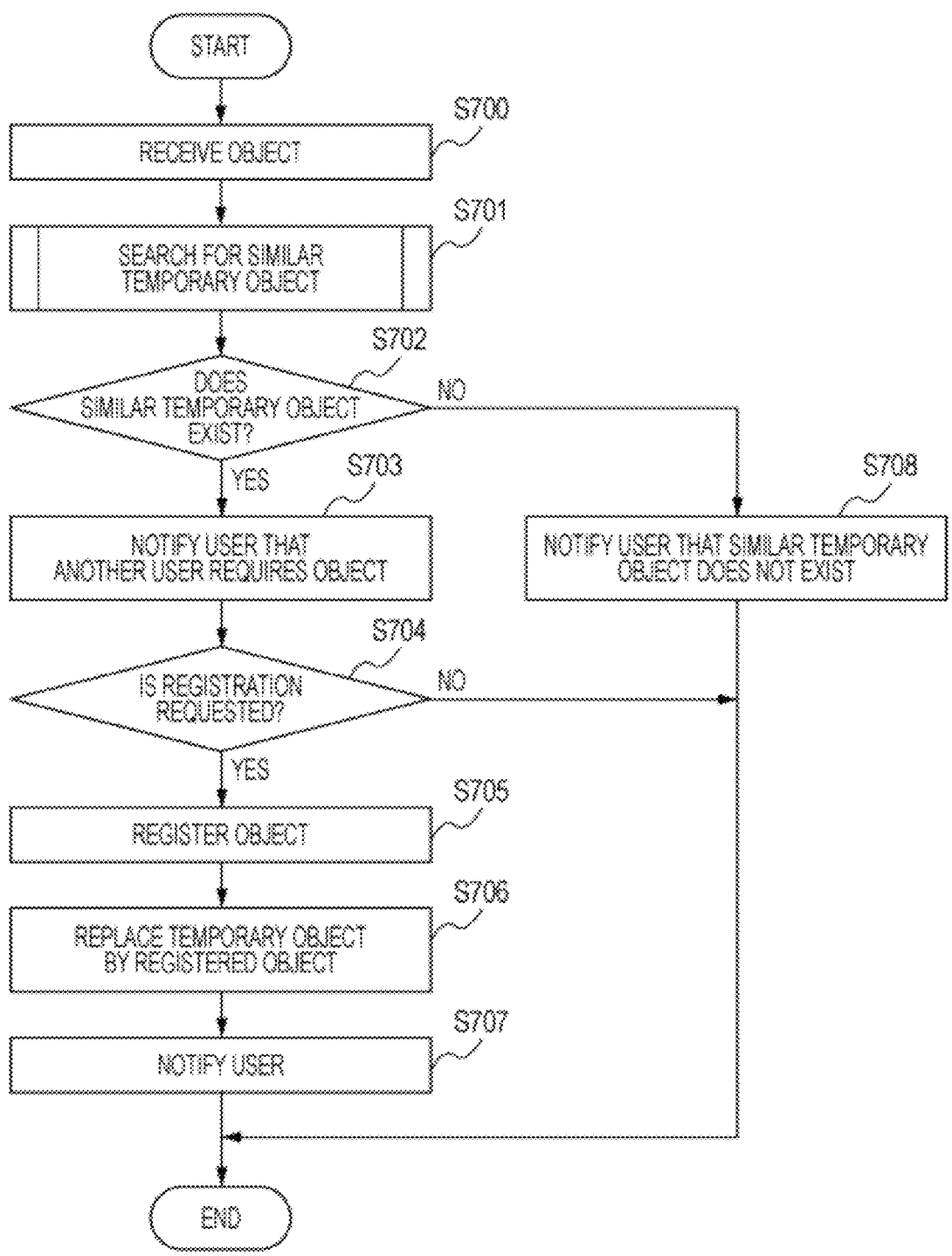
FIG. 7 is a flowchart illustrating a process of operating an object in an object storing unit in a document managing server PC according to the first embodiment.

FIG. 7 is a flowchart illustrating a process of comparing the attribute information of the object transmitted in step S601 in FIG. 6 with attribute information of a temporary object. Hereinafter, the process is described with reference to FIG. 7.

In step S700, the object transmitted from the MFP 20 in step S601 is received. Here, the object operating unit 310 to mainly control processes of registering and searching for an object receives the object.

In step S701, the object received in step S700 is compared with the temporary objects registered in the object storing unit 311 in the document managing server PC 30, and a similar temporary object is searched for. The details of comparison and search performed in this step are described below.

If it is determined in step S702 that a similar temporary object is found in the object storing unit 311 in step S701, the process proceeds to step S703. If no similar temporary object is found in the object storing unit 311, the process proceeds to step S708. Here, the similar temporary object means a temporary object having a similarity value equal to or higher than a predetermined threshold (described below). The threshold used to select a similar object can be arbitrarily set by the user. For example, when the threshold is set to 3, the temporary object having an object ID 3 shown in table (b) in FIG. 14 matches as a result of search. The similarity is calculated on the basis of the attribute information of the object. When an object in which at least one piece of attribute information matches is searched for as a similar temporary object, the threshold may be set to 1.

In step S703 (if a similar temporary object is found in the object storing unit 311 in step S701), the user who operates the MFP 20 (object registrant) is notified that another user requires the object to be registered for reuse. The notification is transmitted as a response in step S602. Alternatively, in this step, whether reuse of the object is permitted or not may be automatically determined on the basis of the user information of the object registrant and the user information of another user who reuses the object. Furthermore, reuse may be denied when a highly-confidential word is used in the object. Accordingly, flexible usage restriction based on security is enabled in reuse of the object.

In step S704, information of permission/non-permission of registration of the object based on the process in step S605 is received. If information of permission of registration is received, the process proceeds to step S705. If information of non-permission of registration is received, the process ends.

In step S705, the object received in step S700 is registered in the object storing unit 311, and the similar temporary object found in step S701 is updated with the registered object. At this time, when the object is an image, the object is overwritten with vector data and the attribute information thereof is additionally registered.

Then, in step S706, the temporary object updated in step S705 in the document is replaced by the object registered in step S705. The document generated here is displayed in the manner illustrated in FIG. 10 for reference of the user. In this document, the temporary object is replaced by the actual object.

In step S707, the user who registered the temporary object is notified that the object corresponding to the temporary object has been found. Alternatively, the document including the actual object inserted in step S706 may be transmitted as a notification that the object has been replaced. The notification may be given by transmitting an e-mail or by changing a document icon, and any other method may be used. After step S707, the process ends.

On the other hand, in step S708 (if a similar temporary object is not found in the object storing unit 311 in step S701), a process of registering the object in the object storing unit 311 is performed. As in step S703, whether reuse of the object is permitted or not may be automatically determined on the basis of the user information of the object registrant and the user information of the user who reuses the object. Furthermore, reuse may be denied (object is not registered) when a highly-confidential word is used in the object. Furthermore, a notification that another user does not require the object is transmitted to the user who operates the MFP 20 (object registrant). This means that a similar temporary object is not registered. The information transmitted here is received in step S602. After step S708, the process ends.

<Process of Searching for Similar Temporary Object>

Figure 8:
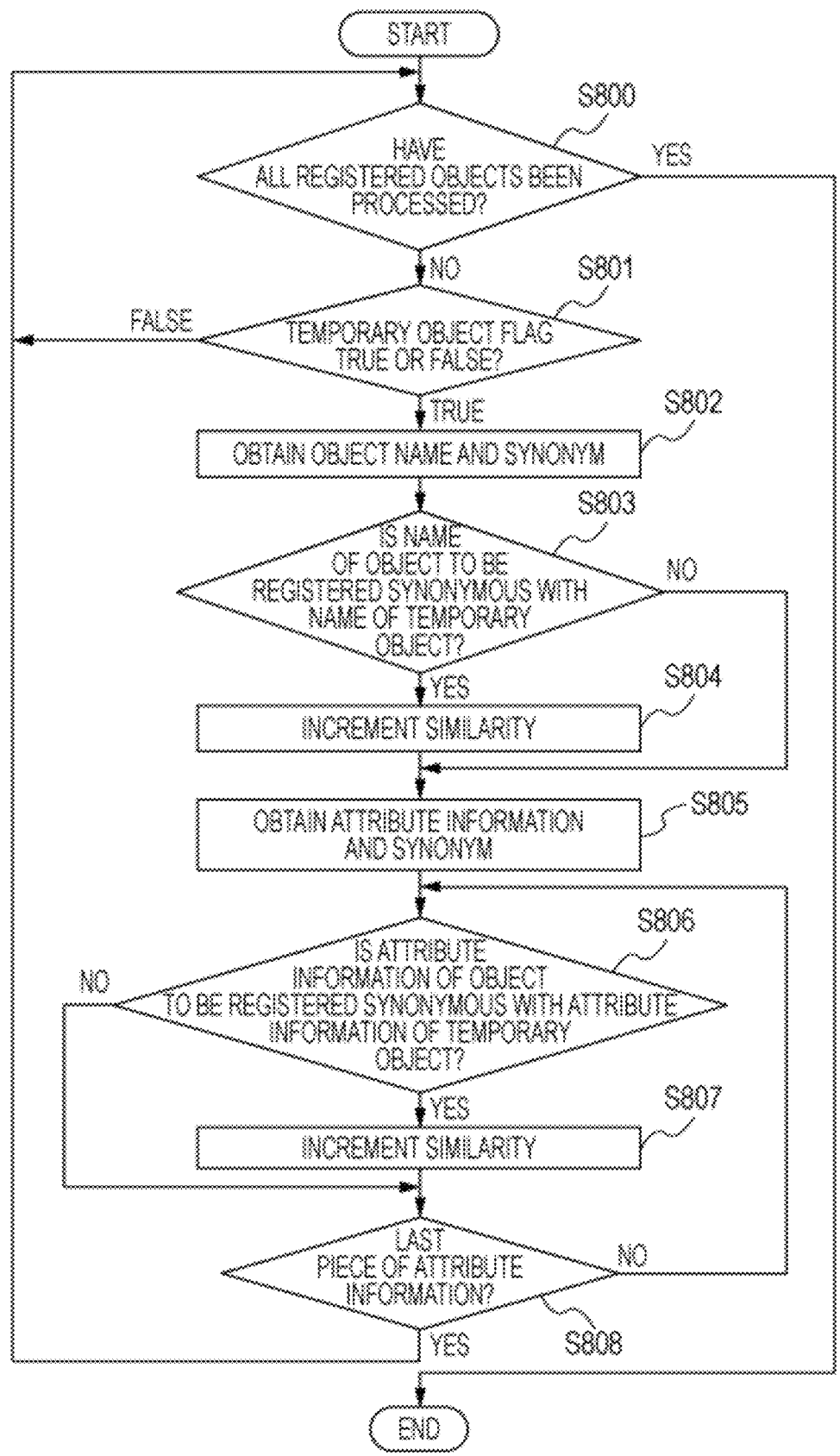
FIG. 8 is a flowchart illustrating a process of calculating similarity to search for a similar temporary object in the document managing server PC according to the first embodiment.

FIG. 8 is a flowchart illustrating a process of searching for a similar temporary object on the basis of the object to be registered in the object registering process performed in the document managing server PC 30. FIG. 14 illustrates an example of data tables used in this flowchart. Specifically, table (a) is a data table of the object that is received in step S700 and that is to be registered. Table (b) is a data table of the objects registered in the object storing unit 311. Hereinafter, the process is described in detail with reference those figures.

In step S800, one record of the objects registered in the object storing unit 311 is obtained, and the process proceeds to step S801. After the last record of the registered objects has been processed (YES), the process ends.

Then, in step S801, information indicating whether the registered object obtained in step S800 is a temporary object is obtained. In this embodiment, the object is determined by using a temporary object flag (TRUE/FALSE). If the object is not a temporary object (FALSE), the process returns to step S800, and the process is performed on the next record. If the object is a temporary object (TRUE), the process proceeds to step S802.

In step S802, the name of the temporary object is obtained. Also, a synonym of the object name is obtained with reference to a synonym dictionary (not illustrated) in the document managing server PC 30. The synonym dictionary provided in the system or that provided in another system may be used. In this embodiment, a dictionary suitable for a user environment is used and thus an original dictionary is provided in the document managing server PC 30.

In step S803, it is determined whether the object name of the object that is received in step S700 and that is to be registered matches the object name of the temporary object obtained in step S802 or its synonym, so that it is determined whether the both object names are synonymous with each other. If the both object names are synonymous with each other, the process proceeds to step S804. Otherwise, the process proceeds to step S805.

In step S804, the similarity of the registered temporary object is incremented by 1. Specifically, the similarity in the data table (b) in FIG. 14 is incremented by 1.

In step S805, the attribute information and synonym of the temporary object are obtained. The acquisition of the synonym is the same as in step S802.

In step S806, it is determined whether the attribute information of the object to be registered is synonymous with the attribute information of the temporary object obtained in step S805. This determination is made in the same manner as in step S803. If there is at least one piece of synonymous attribute information, the process proceeds to step S807. If there is no synonymous attribute information, the process proceeds to step S808.

In step S807, the similarity of the registered temporary object is incremented by 1.

In step S808, it is determined whether the process has been performed on all pieces of the attribute information so as to perform the calculation of similarity in steps S806 and S807 on all pieces of the attribute information of the object to be registered. If calculation of similarity has been performed on all pieces of the attribute information of the object to be registered, the process returns to step S800, and the process is performed on the object of the next record. In this case, when there are a plurality of pieces of attribute information of the object to be registered, the similarity is incremented by the number of times the synonymous information is found in step S806. For example, when the registered temporary object has two pieces of attribute information similar to pieces of information "scanner" and "printer", the similarity is incremented by 2.

According to the first embodiment, a user inserts a temporary object into a document that is being created, so that an object to be used in the document can be reserved in the object storing unit 311. Also, in this system provided here, an object is compared with a temporary object before the object is registered, so that an object required for reuse by another user can be recognized or that a selected object can be registered. Particularly, another user transmits a notification that the user requires an object, and a registrant can select an object to be registered, so that an unnecessary object is not registered in the object storing unit 311. Accordingly, the amount of data can be reduced and the searching efficiency thereafter increases.

Second Embodiment

Hereinafter, a second embodiment is described with reference to the drawings. The difference from the first embodiment is a process of searching for a temporary object.

<Process of Searching for Similar Temporary Object>

Figure 15:
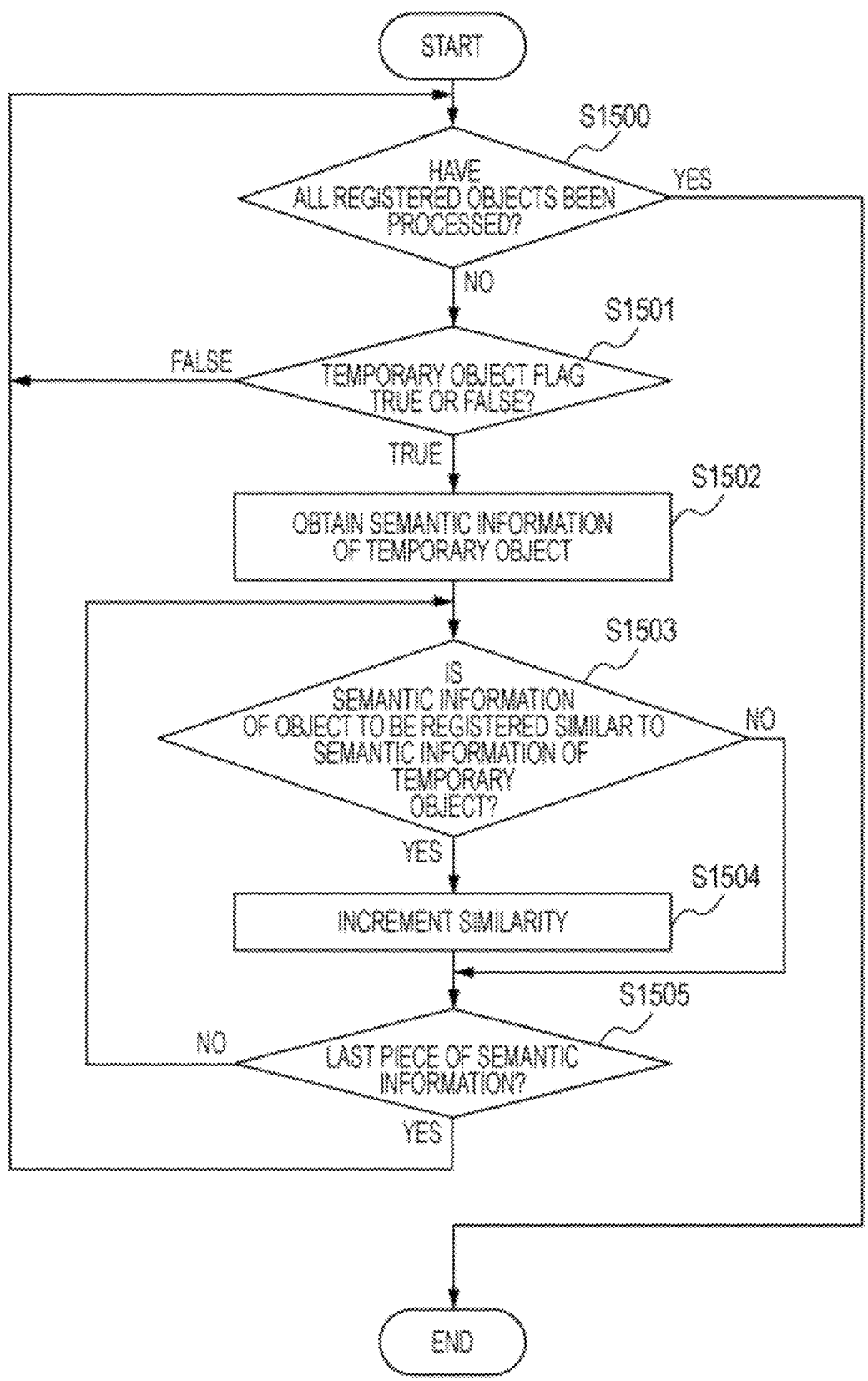
FIG. 15 is a flowchart illustrating a process of calculating similarity to search for a similar temporary object in the document managing server PC according to a second embodiment of the present invention.
Figure 16:
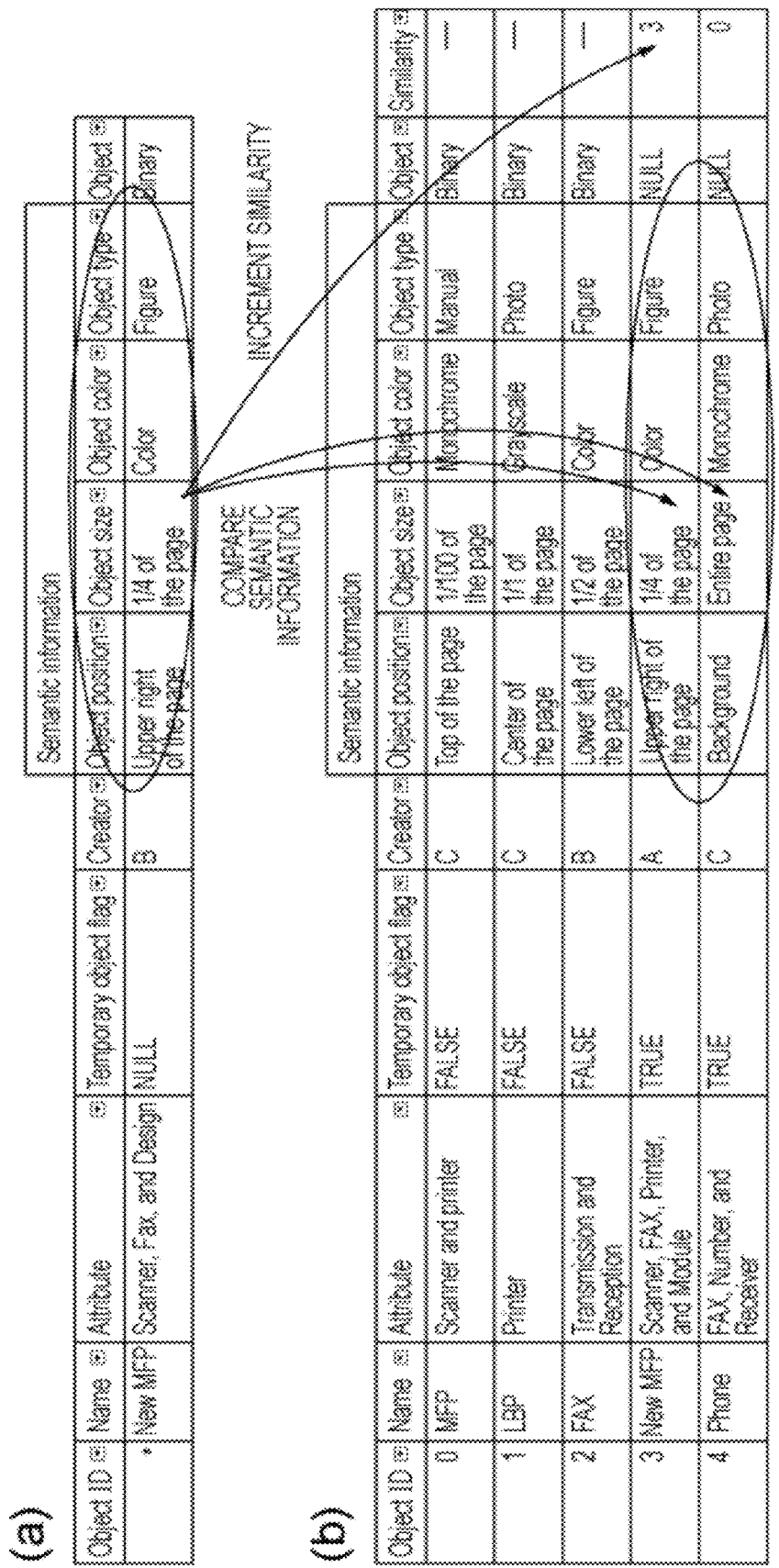
FIG. 16 illustrates an example of data tables used to search for an object according to the second embodiment.

FIG. 15 is a flowchart illustrating a process of searching for a similar temporary object by comparing a registered object with a temporary object during an object registering process performed in the document managing server PC 30. FIG. 16 illustrates an example of data tables (a) and (b) used in this flowchart.

In step S1500, one record of the objects registered in the object storing unit 311 is obtained, and the process proceeds to step S1501. After the last record of the registered objects has been processed (YES), the process ends.

Then, in step S1501, information indicating whether the registered object obtained in step S1500 is a temporary object is obtained. In this embodiment, the object is determined by using a temporary object flag (TRUE/FALSE). If the object is not a temporary object (FALSE), the process returns to step S1500, and the process is performed on the next record. If the object is a temporary object (TRUE), the process proceeds to step S1502.

In step S1502, semantic information of the temporary object is obtained. In this embodiment, the semantic information includes information of a feature value obtained by image analysis when the object is image data, the position of the object in the document from which the object is extracted, and the size, color, and type of the object. The semantic information is not particularly limited as long as it represents a feature, such as how the object is used.

Then, in step S1503, it is determined whether the semantic information of the object to be registered is similar to the semantic information of the temporary object obtained in step S1502. If both pieces of semantic information are similar to each other, the process proceeds to step S1504. Otherwise, the process proceeds to step S1505. Determination of the similarity varies depending on the pieces of semantic information compared with each other. For example, if the semantic information is placement information, determination is made on the basis of the unit of dot, the unit of length, or approximation of coordinates when a page is divided into an arbitrary number of areas. If the semantic information is size information, sizes in the ratio with a dot length or page area being a parameter may be compared, and the size within a predetermined threshold may be determined to be similar.

In step S1504, the similarity of the registered temporary object is incremented by 1.

In step S1505, it is determined whether the process has been performed on all pieces of the semantic information so as to perform the calculation of similarity in steps S1503 and S1504 on all pieces of the semantic information of the object to be registered. If calculation of similarity has been performed on all pieces of the semantic information of the object to be registered, the process returns to step S1500, and the process is performed on the object of the next record. In this case, when there are a plurality of pieces of semantic information of the object to be registered, the similarity is incremented by the number of times the synonymous information is found in step S1503.

According to the second embodiment of the present invention, the similarity of objects is determined on the basis of how the object is used in an original document and semantic information indicating an analysis result of image data, so that the accuracy of searching for a similar object can be increased.

Supplemental Description of Embodiments

Hereinafter, a supplemental description of embodiments is given.

In step S503 in FIG. 5, when attribute information is given to the temporary object, the user may draw a picture showing the content of the temporary object by hand and may register the picture by inputting it by using a predetermined input unit. When an object showing a temporary object, which is image data, is inserted, the document managing server PC 30 analyzes the image data and holds an image feature value as attribute information of the temporary object. The attribute information may be used as part of semantic information. This information is used in a process of calculating the similarity in steps S1503 and S1504 in FIG. 15.

Other Embodiments

Various embodiments have been described in detail above. The present invention can be applied to a system including a plurality of apparatuses or a single apparatus, for example, a printer, a facsimile, a PC, and a computer system including a server and a client.

The present invention can also be achieved by providing a software program for realizing the functions of the above-described exemplary embodiments directly or from a remote site to the system or apparatus, and by allowing a computer included in the system or apparatus to read and execute the provided program code.

In this case, the program code itself installed in an information processing apparatus in order to realize the functions and processes of the present invention realizes the present invention. That is, the computer program itself to realize the above-described functions and processes constitutes an embodiment of the present invention.

The program can take any form, for example, an object code, a program executed by an interpreter, or script data supplied to an operating system (OS), as long as it has the functions of the program.

A recording medium to supply the program can be, for example, a flexible disk, a hard disk, an optical disk, a magneto-optical disk (MO), a CD-ROM, a CD-recordable (CD-R), a CD-rewritable (CD-RW), a magnetic tape, a nonvolatile memory card, a ROM, or a digital versatile disc (DVD, DVD-ROM, and DVD-R).

The program can also be downloaded from a website on the Internet via a browser of a client information processing apparatus. The computer program itself or a compressed file including an auto-install function can be downloaded from the website onto a recording medium such as a hard disk. In addition, the program code constituting the program of an embodiment of the present invention can be divided into a plurality of files, and each file can be downloaded from one or more websites. Namely, the present invention can be applied to a World Wide Web (WWW) server that allows numerous users to download the program files so that the functions or processes of the present invention can be realized on their computers.

Furthermore, the program can be encrypted and stored in a storage medium, such as a CD-ROM, to be distributed to users. A user who satisfies given conditions can download the key information for decrypting the program from a website via the Internet. By using the key information, the encrypted program can be executed and installed in an information processing apparatus.

Furthermore, the functions of the above-described exemplary embodiments can be realized by a computer by executing the read program. An operating system (OS) or the like working on the computer can also perform a part or the whole of actual processes according to instructions of the program. Of course, the functions of the above-described exemplary embodiments can be realized in this case.

Furthermore, the program read from a recording medium can be written in a memory equipped in a function expansion board inserted in an information processing apparatus or a function expansion unit connected to the information processing apparatus, and a CPU in the function expansion board or the function expansion unit can execute all or a part of the processing based on the instructions of the program to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-138046 filed May 27, 2008, which is hereby incorporated by reference herein in its entirety.

What is claimed is:

1. A managing apparatus comprising:
a storage unit configured to store a temporary object that has attribute information specified and that does not include partial-area data on the basis of instructions from a first user at a first time;
an object receiving unit configured to receive from a second user at a second time an object that includes partial-area data extracted from document data and that has attribute information specified, wherein the partial-area data extracted from the document data includes image data extracted from document data that is input through a scanning process or a printing process in an image processing apparatus, and wherein the first time precedes the second time;

a searching unit configured to search the storage unit for the temporary object having attribute information specified that matches at least one piece of attribute information of the object received by the object receiving unit; and a notifying unit configured to notify the first user that the object corresponding to the temporary object stored in the storage unit has been received in response to a search result generated by the searching unit indicating that there is a match.

2. The managing apparatus according to claim 1, wherein the searching unit searches for the temporary object by using the attribute information and a synonym of the attribute information.

3. The managing apparatus according to claim 1, wherein the partial-area data of the object corresponding to the temporary object searched for by the searching unit is registered as partial-area data of the temporary object in the storage unit.

4. The managing apparatus according to claim 1, wherein the storage unit stores document data including the temporary object, the managing apparatus further comprising:
an updating unit configured to perform update by replacing the temporary object in the document data stored in the storage unit by the object corresponding to the temporary object that is searched for by the searching unit and that is stored in the storage unit.

5. The managing apparatus according to claim 1, wherein the attribute information includes at least one of an object name, a creator, color information, size information, and placement information of the object in the document data.

6. An information processing method comprising:
storing a temporary object that has attribute information specified and that does not include partial-area data in a storage unit on the basis of instructions from a first user at a first time;

receiving from a second user at a second time an object that includes partial-area data extracted from document data and that has attribute information specified, wherein the partial-area data extracted from the document data includes image data extracted from document data that is input through a scanning process or a printing process in an image processing apparatus, wherein the first time precedes the second time;

searching the storage unit for the temporary object having attribute information specified that matches at least one piece of attribute information of the object received in the receiving; and notifying the first user that the object corresponding to the temporary object stored in the storage unit has been received in response to a search result generated in the searching indicating that there is a match.

7. The information processing method according to claim 6,
wherein, in the searching, the temporary object is searched for by using the attribute information and a synonym of the attribute information.

8. The information processing method according to claim 6,
wherein, in the storing, partial-area data of the temporary object is updated with the partial-area data of the object corresponding to the temporary object searched for in the searching, and the updated partial-area data is stored in the storage unit.

9. The information processing method according to claim 6,
wherein, in the storing, document data including the temporary object is stored in the storage unit,
the information processing method further comprising:
performing update by replacing the temporary object in the document data stored in the storage unit by the object corresponding to the temporary object that is searched for in the searching and that is stored in the storage unit.

10. A non-transitory computer-readable storage medium storing a program to execute the information processing method according to claim 6.

11. An image processing apparatus connected to a managing apparatus to manage an object that includes partial-area data extracted from document data and that has attribute information specified, the image processing apparatus responsive to a first user and a second user and comprising:
an extracting unit configured to extract partial-area data from input document data from the second user, wherein the partial-area data extracted from the document data includes image data extracted from document data that is input through a scanning process or a printing process in an image processing apparatus;
a transmitting unit configured to transmit information of an object based on the partial-area data extracted by the extracting unit to the managing apparatus;
a receiving unit configured to receive, as a response to the information transmitted by the transmitting unit, a notification that the object based on the partial-area data extracted by the extracting unit is an object corresponding to a temporary object that was previously stored by the first user and that has specified attribute information stored in the managing apparatus and that does not include partial-area data;
a display unit configured to perform display to accept instructions to register the object based on the partial-area data extracted by the extracting unit from the second user; and
an object transmitting unit configured to transmit the object to be registered to the managing apparatus,
wherein the display unit displays the object corresponding to the temporary object stored in the managing apparatus so that the object can be identified, on the basis of the notification received by the receiving unit.

12. An information processing method in an image processing apparatus connected to a managing apparatus to manage an object that includes partial-area data extracted from document data and that has attribute information specified, the information processing method responsive to a first user and a second user and comprising:
extracting partial-area data from input document data from the second user, wherein the partial-area data extracted from the document data includes image data extracted from document data that is input through a scanning process or a printing process in an image processing apparatus;
transmitting information of an object based on the partial-area data extracted in the extracting to the managing apparatus;
receiving, as a response to the information transmitted in the transmitting, a notification that the object based on the partial-area data extracted in the extracting is an object corresponding to a temporary object that was previously stored by the first user and that has specified attribute information stored in the managing apparatus and that does not include partial-area data;

performing display to accept instructions to register the object based on the partial-area data extracted in the extracting from the second user; and transmitting the object to be registered to the managing apparatus, wherein, in the performing display, the object corresponding to the temporary object stored in the managing apparatus is displayed so that the object can be identified, on the basis of the notification received in the receiving.

13. A non-transitory computer-readable storage medium storing program to execute the information processing method according to claim 12.

* * * * *